(12) United States Patent
Pasqualetto et al.

(10) Patent No.: US 10,535,991 B2
(45) Date of Patent: Jan. 14, 2020

(54) METHOD OF MANAGING AN ELECTRONIC CIRCUIT INCLUDING A THERMAL PROTECTION DEVICE AND CORRESPONDING ELECTRONIC CIRCUIT

(71) Applicants: CONTINENTAL AUTOMOTIVE FRANCE, Toulouse (FR); CONTINENTAL AUTOMOTIVE GmbH, Hannover (DE)

(72) Inventors: Angelo Pasqualetto, Toulouse (FR); Jean-Marie Quintin, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 493 days.

(21) Appl. No.: 14/267,178

(22) Filed: May 1, 2014

(65) Prior Publication Data

US 2014/0340803 A1 Nov. 20, 2014

(30) Foreign Application Priority Data

May 16, 2013 (FR) .................................. 13 54419

(51) Int. Cl.
*H02H 5/04* (2006.01)
*H02H 7/08* (2006.01)
*H02H 3/08* (2006.01)

(52) U.S. Cl.
CPC .......... *H02H 7/0838* (2013.01); *H02H 3/085* (2013.01); *H02H 5/045* (2013.01)

(58) Field of Classification Search
CPC .................................................... H02H 7/0838
(Continued)

(56) References Cited

U.S. PATENT DOCUMENTS 4,368,412 A * 1/1983 Inoue ................... G05B 19/231
318/568.1
5,200,872 A * 4/1993 D'Entremont ........... H02H 5/08
310/68 C (Continued)

FOREIGN PATENT DOCUMENTS

CN 101431228 A 5/2009
CN 101688714 A 3/2010
(Continued)

OTHER PUBLICATIONS

FR Search Report, dated Feb. 6, 2014, from corresponding FR application.

*Primary Examiner* — Thienvu V Tran
*Assistant Examiner* — Lucy M Thomas
(74) *Attorney, Agent, or Firm* — Young & Thompson

(57) ABSTRACT

A method for managing an electronic circuit (2) including a thermal protection device (12) interrupting the operation of the electronic circuit when a measured temperature exceeds a predetermined threshold, includes counting the electronic circuit operation interruptions and interrupting the operation of the electronic circuit when the number of counted interruptions reaches a predetermined value and when no reset has taken place. The corresponding circuit includes: a counter (16); linking elements between the counter and the thermal protection device such that the counter can indicate the number of operation interruptions caused by the thermal protection device; and elements for resetting the counter.

16 Claims, 1 Drawing Sheet

(58) Field of Classification Search
USPC .......................................................... 361/103
See application file for complete search history.

(56) References Cited

U.S. PATENT DOCUMENTS

| | | | | |
|---|---|---|---|---|
| 5,486,747 | A * | 1/1996 | Welch | H02P 6/00 |
| | | | | 318/569 |
| 5,510,687 | A | 4/1996 | Ursworth et al. | |
| 2003/0184272 | A1 * | 10/2003 | Grossmann | H02P 7/04 |
| | | | | 323/283 |
| 2010/0132385 | A1 * | 6/2010 | Yoo | F25D 29/006 |
| | | | | 62/115 |
| 2010/0236264 | A1 * | 9/2010 | Lifson | F25B 49/005 |
| | | | | 62/115 |
| 2011/0249371 | A1 | 10/2011 | Jin et al. | |
| 2012/0106014 | A1 | 5/2012 | Tornare | |
| 2013/0176649 | A1 * | 7/2013 | Wallis | H02H 5/041 |
| | | | | 361/24 |

FOREIGN PATENT DOCUMENTS

| | | |
|---|---|---|
| EP | 1 035 001 A2 | 9/2000 |
| JP | 06 318824 A | 11/1994 |
| RU | 2115987 C1 | 7/1998 |
| WO | 2005/099053 A1 | 10/2005 |
| WO | 2011/883548 A1 | 1/2011 |

* cited by examiner

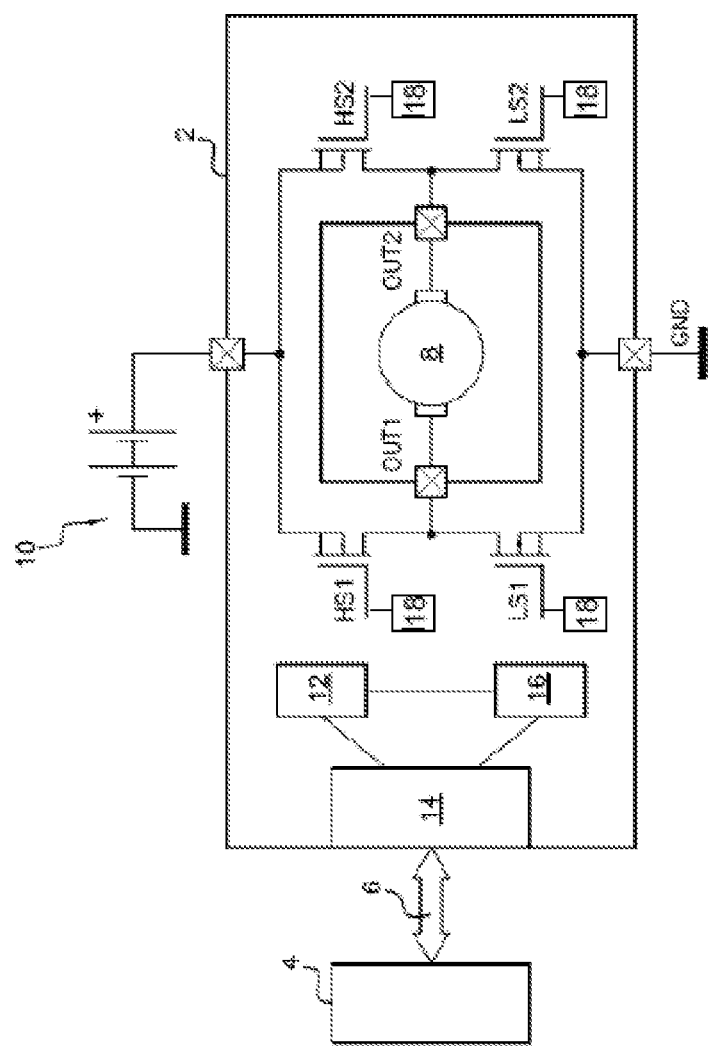

METHOD OF MANAGING AN ELECTRONIC CIRCUIT INCLUDING A THERMAL PROTECTION DEVICE AND CORRESPONDING ELECTRONIC CIRCUIT

FIELD OF THE INVENTION

The present invention relates to a method of managing an electronic circuit provided with a thermal protection device and a corresponding electronic circuit.

An electronic circuit to which the present invention relates is, for example, a power circuit in which relatively strong electric currents flow, particularly a circuit for controlling a motor. The present invention can, however, also relate to other circuits.

BACKGROUND OF THE INVENTION

The majority of electronic circuits, for which overheating is a risk, include a thermal protection device to prevent damage from excessive temperatures. When a first predetermined temperature is reached, this first temperature, of course, being less than an operating temperature that would risk damaging the corresponding circuit, the circuit is switched such that the output thereof is in the so-called "high impedance" state, also called "third state". Such a state can be likened to an open circuit since, when this output is connected to a low impedance component, this component will not affect it. In this state, there is no longer any electric current flowing in the circuit and, therefore, the temperature of the circuit can decrease.

When the temperature of the circuit falls below a predetermined threshold corresponding to a second temperature, this second temperature being less than the first aforementioned temperature, the thermal protection can be stopped and the circuit is then switched for normal operation.

If the temperature increase which has caused the thermal protection process to start is due to a failure, this failure will reproduce a temperature increase in the circuit when the circuit is operated again if it is not eliminated. Therefore, this will repeatedly cause series of operational interruptions followed by restarting said circuit. These repeated cut-offs and starts can be damaging for the electronic circuit.

In particular, they cause accelerated degradation of said electronic circuit and, therefore, reduced reliability of the circuit.

SUMMARY OF THE INVENTION

The aim of the invention, then, is to provide a management method and means for preventing excessive cut-offs and restarts of an electronic circuit in order to prevent premature degradation thereof. Preferably, the means used will not substantially increase the cost of the electronic circuit.

To this end, the present invention proposes a method of managing an electronic circuit including a thermal protection device interrupting the operation of the circuit when a measured temperature exceeds a predetermined threshold.

According to the present invention, this method includes the following steps:
  counting the circuit operation interruptions caused by the thermal protection device,
  interrupting the operation of the circuit when the number of counted circuit operation interruptions caused by the thermal protection device reaches a predetermined value and when no reset has taken place.

By carrying out this method, it is therefore possible to limit the number of interruptions and prevent such interruptions from being produced in a continuous loop. The maximum number of interruptions is chosen as representative of abnormal operation.

In a method according to the present invention, the circuit operation interruptions caused by the thermal protection device are, for example, counted by incrementing a register at each operation interruption caused by the thermal protection device.

It is possible that resetting takes place when the electronic circuit is powered.

The present invention also relates to an electronic circuit provided with a thermal protection device and with means for interrupting the operation of the circuit when a predetermined temperature is reached.

According to the present invention, this electronic circuit further includes:
  a counter,
  linking means between the counter and the thermal protection device such that the counter can indicate the number of operation interruptions caused by the thermal protection device,
  means for interrupting the operation of the electronic circuit when the number of interruptions counted reaches a predetermined value and when the counter has not been reset, and
  means for resetting the counter.

When a microcontroller manages and/or controls the electronic circuit according to the present invention, this circuit advantageously includes an interface for linking with the microcontroller.

An electronic circuit according to the invention is, for example, a circuit for controlling a motor.

An electronic circuit according to the invention can include, for example, a H-bridge with four driving transistors. In this alternative embodiment, the electronic circuit advantageously includes at least one temperature sensor placed proximate to a transistor.

BRIEF DESCRIPTION OF THE DRAWINGS

Details and advantages of the present invention will emerge more clearly from the following description with reference to the appended schematic drawing wherein the single FIGURE shows an embodiment of an electronic circuit according to the present invention.

DETAILED DESCRIPTION OF THE INVENTION

The appended single FIGURE shows an electronic circuit 2 according to the present invention and a control and management device associated with this electronic circuit 2. The control and management device is, for example, in the form of a computer, or microcontroller 4, linked to the circuit via a link 6. This is, for example, a so-called SPI (Serial Peripheral Interface) link, i.e. a synchronous serial data bus which establishes a master-slave relationship between the linked components. In this case, the microcontroller 4 is the master and sends data (instructions) to the electronic circuit 2.

In this case, it is assumed that the electronic circuit 2 is a circuit for controlling a motor 8. Such a control circuit can be, as illustrated, a circuit incorporating a H-bridge then including, in a conventional manner, four transistors which, in this case, are called HS1, HS2, LS1 and LS2. These transistors are generally driven asymmetrically. Therefore, HS1 and LS2 will be conductive to rotate the motor 8 in one rotation direction whereas HS2 and LS1 will be conductive to rotate the motor 8 in the reverse direction. The operation and advantages of a H-bridge are known to a person skilled in the art and, therefore, are not described in greater detail in this case. It should also be noted that although the present invention is particularly suited to a circuit for controlling a motor including a H-bridge, the application thereof is not limited to such a type of circuit, nor even to a motor control circuit.

The electronic circuit 2 is powered by a battery 10 and is also linked to a ground GND. The H-bridge has two outputs called OUT1 and OUT2 in the FIGURE. The terminals of the motor 8, as is illustrated in the single FIGURE, are connected to the outputs OUT1 and OUT2.

As is known per se, the electronic circuit 2 also includes a protection device 12 for preventing the electronic circuit 2 from reaching an excessive temperature. This protection device 12 is linked by means of an interface 14 and the link 6 to the microcontroller 4. When an excessive temperature is detected, the device 12 interrupts the operation of the motor 8 as explained below. The corresponding information is also sent to the microcontroller 4.

It is assumed that at least one of the transistors HS1, HS2, LS1 or LS2 is provided with a temperature sensor 18, this sensor being directly positioned on the corresponding transistor or placed preferably in immediate proximity thereto. It is advantageous for the purposes of monitoring that each transistor is provided with its own temperature sensor. In an alternative embodiment, to reduce the cost of the device, it can be envisaged that the four transistors are grouped about a central temperature sensor. Each of the temperature sensors is connected to the protection device 12. By way of example, one possible operating mode for the protection device 12 is quickly described below.

When a temperature greater than a predetermined value T1 is detected at a temperature sensor 18, for a duration greater than a reference duration t1, the protection device 12 places the outputs OUT1 and OUT2 in the high impedance state. To this end, the four transistors HS1, HS2, LS1 and LS2 are blocked and do not conduct any electric current.

While the temperature measured at the temperature sensors 18 does not go back down below a value T2 (<T1) for a duration at least equal to t2, the outputs OUT1 and OUT2 remain in the high impedance state. By contrast, when the measured temperature remains less than T2 for a duration at least equal to t2, the protection device 12 restarts the motor 8.

If there is a short circuit, for example, which is not a dead short circuit, between the battery 10 and an output, for example OUT1, when the transistor LS1 is conductive, this then causes a large increase in the strength of the current in the electronic circuit 2 and, as a result, an increase in the temperature by Joule effect. The protection device 12 will detect this increase in temperature and trigger the high impedance state of the outputs OUT1 and OUT2 of the electronic circuit 2. Since there is no longer any current flowing therein, the temperature thereof will then gradually decrease until it becomes less than T2 for a duration greater than t2 at all of the temperature sensors. The device 12 then stops the protection, which results in the motor 8 being restarted. However, while the short circuit between the battery 10 and the output OUT1 is not eliminated, an operational interruption will be caused by the protection device 12 after the transistor LS1 is again conductive.

This, then, causes repeated interruptions.

To prevent such repeated interruptions, the invention proposes providing the electronic circuit 2 with a counter 16. The latter is advantageously incorporated in the electronic circuit 2 but could, however, also be a component external to said circuit. In the remainder of the description, it is assumed that the counter 16 is incorporated in the H-bridge. This counter 16 is then linked firstly to the protection device 12 and secondly to the interface 14 in order to be able to communicate with the microcontroller 4.

The aim of the counter 16 is to count the number of times that the protection device 12 triggers an interruption. For example, it can be assumed that the counter 16 manages a 6-bit code located in a register of the counter and corresponding then to a variable of between 0 and 63. This code is, for example, initialized to the value 000000 (corresponding to 0) and the corresponding register is incremented each time that an interruption is triggered by the protection device 12. The corresponding value is accessible to the microcontroller 4 by means of the link 6, for example an SPI link.

When the code of the register incremented within the counter 16 reaches a predetermined value Nmax, which can be, for example, 63 but also a value less than 63, the outputs OUT1 and OUT2 of the electronic circuit 2 are placed in the high impedance state until a specific condition is then met. For example, it is envisaged that, in addition, the temperature at the electronic circuit 2 has dropped again below T2 for a duration at least equal to t2 and an external action is carried out. If these two conditions have been met, the counter 16 can then be reset.

The external action is, for example, an action of applying voltage to the electronic circuit 2. Alternatively or concurrently, a DI (DI for Digital Input) pin can be provided to reset the counter 16. This DI pin can be, for example, in a low state (equivalent to 0) or in a high state (equivalent to 1). It can therefore be envisaged that, if the DI pin moves from the low state thereof to the high state thereof before the temperature of the circuit (i.e. the temperature at all of the temperature sensors) is less than T2 for at least the duration t2, then the register of the counter 16 is not reset. By contrast, if the DI pin moves from the low state thereof to the high state thereof after the temperature of the circuit (i.e. the temperature measured at all of the temperature sensors) is less than T2 for at least the duration t2, then the register of the counter 16 is reset.

Therefore, it is possible to effectively limit the number of times that a thermal protection of the electronic circuit 2 is activated by the protection device 12.

The proposed solution is easy to implement and does not result in substantial additional cost since the use of a counter is not expensive. The other elements, particularly the SPI link, are often present in electronic circuits, particularly in the field of automotive electronics.

It can be noted that the function described above can be easily inhibited. This can simply be done, for example, by programming the value of admissible maximum cut-offs (called Nmax above) to the initialization value of the register managed by the counter 16 (namely 0). The register is then incremented as described above but even if it reaches the maximum possible value (63 in the example above for a 6-bit code), the thermal protection function continues to function "normally" without limitation. In this case, the symbol value 0 will have coded, in fact, infinitely, i.e. an unlimited number of cut-offs.

The present invention is not limited to the method described above and to the alternatives thereof, nor to the device described and illustrated in the single FIGURE, but relates to all alternatives suggested and within the reach of a person skilled in the art.

For example, the counter can have more than 6 bits.

It can also be envisaged that the initialization of the counter occurs after the detection of a stable restart of the electronic circuit, i.e. a restart of said circuit without subsequent interruption before a time period less than a fixed duration t3.

The invention claimed is:

1. A method of managing an electronic circuit including a thermal protection device interrupting the operation of the electronic circuit when a measured temperature exceeds a first predetermined threshold, the method comprising:
    sensing, by at least one temperature sensor, the temperature of at least one electronic component of the electronic circuit;
    repeatedly interrupting the operation of the electronic circuit, when the temperature of the at least one electronic component sensed by the temperature sensor and received by the thermal protection device exceeds the first predetermined threshold, by the thermal protection device placing outputs of the electronic circuit in a high impedance state such that transistors of the electronic circuit are blocked and do not conduct any electric current, until the temperature sensed by the temperature sensor drops below a second predetermined temperature lower than the first predetermined temperature, resulting in a motor of the electronic circuit restarting;
    counting a number of electronic circuit operation interruptions caused by the thermal protection device each time the thermal protection device interrupts the operation of the electronic circuit; and
    when the number of counted electronic circuit operation interruptions caused by the thermal protection device reaches a predetermined value, placing the outputs of the electronic circuit in the high impedance state such that the transistors of the electronic circuit remain blocked until the temperature of the electronic component drops below the second predetermined threshold for a specified duration and an external action is carried out, the external action being one or more of an action of applying voltage to the electronic circuit and an action of moving a digital input (DI) pin from a low state to a high state.

2. The management method as claimed in claim 1, wherein the electronic circuit operation interruptions caused by the thermal protection device are counted by incrementing a register at each interruption.

3. The management method as claimed in claim 1, wherein the counter is reset when the electronic circuit is powered without a subsequent interruption for a specified time period.

4. The management method as claimed in claim 2, wherein the counter is reset when the electronic circuit is powered without a subsequent interruption for a specified time period.

5. The management method as claimed in claim 1, further comprising:
    accessing, by a microcontroller, a counter to determine the number of counted electronic circuit operation interruptions; and
    transmitting, by the microcontroller, instructions to cause the operation of the electronic circuit to be interrupted such that the electric current does not flow through the electronic circuit when the number of counted electronic circuit operation interruptions reaches the predetermined value.

6. The electronic circuit as claimed in claim 2, further comprising a microcontroller operatively connected to a counter to access the counter to determine the number of counted electronic circuit operation interruptions and configured to transmit instructions to cause the operation of the electronic circuit to be interrupted such that the electric current does not flow through the electronic circuit when the number of counted electronic circuit operation interruptions reaches the predetermined value.

7. An electronic circuit comprising:
    a thermal protection device operatively connected to at least one temperature sensor that is configured to sense a temperature of at least one electronic component of the electronic circuit, the operation of the electronic circuit being repeatedly interrupted, when the temperature of the at least one electronic component sensed by the temperature sensor and received by the thermal protection device exceeds a first predetermined threshold, by the thermal protection device placing outputs of the electronic circuit in a high impedance state such that transistors of the electronic circuit are blocked and do not conduct any electric current, until the temperature sensed by the temperature sensor drops below a second predetermined temperature lower than the first predetermined temperature, resulting in a motor of the electronic circuit restarting;
    a counter configured to be reset; and
    a connection linking the counter and the thermal protection device such that the counter indicates the number of operation interruptions caused by the thermal protection device each time the thermal protection device interrupts the operation of the electronic circuit,
    wherein, when the number of counted electronic circuit operation interruptions caused by the thermal protection device reaches a predetermined value, placing the outputs of the electronic circuit in the high impedance state such that the transistors of the electronic circuit remain blocked until the temperature of the electronic circuit drops below the second predetermined threshold for a specified duration and an external action is carried out, the external action being one or more of an action of applying voltage to the electronic circuit and an action of moving a digital input (DI) pin from a low state to a high state.

8. The electronic circuit as claimed in claim 7, further comprising an interface configured to link with a microcontroller.

9. The electronic circuit as claimed in claim 7, wherein the electronic circuit is configured to control a motor.

10. The electronic circuit as claimed in claim 7, further comprising a H-bridge with the transistors that are four driving transistors.

11. The electronic circuit as claimed in claim 10, further comprising the at least one temperature sensor, the at least one temperature sensor being disposed proximate to a transistor.

12. The electronic circuit as claimed in claim 8, wherein the electronic circuit is configured to control a motor.

13. The electronic circuit as claimed in claim 8, further comprising a H-bridge with the transistors that are four driving transistors.

14. The electronic circuit as claimed in claim 9, further comprising a H-bridge with the transistors that are four driving transistors.

15. The electronic circuit as claimed in claim 13, further comprising the at least one temperature sensor, the at least one temperature sensor being disposed proximate to a transistor.

16. The electronic circuit as claimed in claim 14, further comprising the at least one temperature sensor, the at least one temperature sensor being disposed proximate to a transistor.

* * * * *